(12) United States Patent
Liu et al.

(10) Patent No.: US 11,853,760 B2
(45) Date of Patent: *Dec. 26, 2023

(54) MODEL CONVERSION METHOD, DEVICE, COMPUTER EQUIPMENT, AND STORAGE MEDIUM

(71) Applicant: Cambricon Technologies Corporation Limited, Beijing (CN)

(72) Inventors: Shaoli Liu, Beijing (CN); Jun Liang, Beijing (CN); Qi Guo, Beijing (CN)

(73) Assignee: CAMBRICON TECHNOLOGIES CORPORATION LIMITED, Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/703,757

(22) Filed: Mar. 24, 2022

(65) Prior Publication Data

US 2022/0214875 A1 Jul. 7, 2022

Related U.S. Application Data

(63) Continuation of application No. 16/667,593, filed on Oct. 29, 2019, now Pat. No. 11,314,507, which is a
(Continued)

(30) Foreign Application Priority Data

Aug. 10, 2018 (CN) .......................... 201810913895.6

(51) Int. Cl.
*G06F 9/30* (2018.01)
*G06N 20/00* (2019.01)
(Continued)

(52) U.S. Cl.
CPC ............. *G06F 9/3004* (2013.01); *G06F 8/35* (2013.01); *G06F 9/44505* (2013.01); *G06N 3/08* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 8,495,559 | B2 * | 7/2013 | Akkiraju | G06F 8/34 |
| | | | | 717/136 |
| 8,516,435 | B2 * | 8/2013 | Akkiraju | G06F 8/10 |
| | | | | 717/162 |

(Continued)

FOREIGN PATENT DOCUMENTS

| | | |
|---|---|---|
| CN | 101430647 A | 5/2009 |
| CN | 101937351 A | 1/2011 |

(Continued)

OTHER PUBLICATIONS

Machine Translation of Chinese Patent Application CN 112685069 A, 2021. (Year: 2021).*

(Continued)

*Primary Examiner* — Steven G Snyder
(74) *Attorney, Agent, or Firm* — Getech Law LLC; Jun Ye

(57) ABSTRACT

A model conversion method is disclosed. The model conversion method includes obtaining model attribute information of an initial offline model and hardware attribute information of a computer equipment, determining whether the model attribute information of the initial offline model matches the hardware attribute information of the computer equipment according to the initial offline model and the hardware attribute information of the computer equipment and in the case when the model attribute information of the initial offline model does not match the hardware attribute information of the computer equipment, converting the initial offline model to a target offline model that matches the hardware attribute information of the computer equipment (Continued)

according to the hardware attribute information of the computer equipment and a preset model conversion rule.

20 Claims, 10 Drawing Sheets

Related U.S. Application Data continuation of application No. PCT/CN2019/080510, filed on Mar. 29, 2019.

(51) Int. Cl.
*G06F 9/445* (2018.01)
*G06N 3/08* (2023.01)
*G06F 8/35* (2018.01)

(56) References Cited

U.S. PATENT DOCUMENTS

| | | | | |
|---|---|---|---|---|
| 8,813,024 B2* | 8/2014 | Akkiraju | ............ | G06F 8/35 717/104 |
| 8,826,225 B2* | 9/2014 | Perrin | ............ | G06F 8/10 717/100 |
| 10,469,327 B1* | 11/2019 | Velmurugan | ............ | H04L 67/10 |
| 10,902,845 B2* | 1/2021 | Zhan | ............ | G10L 15/14 |
| 2004/0249645 A1* | 12/2004 | Hauser | ............ | G06Q 10/067 705/348 |
| 2007/0288412 A1* | 12/2007 | Linehan | ............ | G06Q 10/06 706/45 |
| 2008/0082959 A1* | 4/2008 | Fowler | ............ | G06F 9/44505 717/104 |
| 2009/0319981 A1* | 12/2009 | Akkiraju | ............ | G06F 8/10 717/104 |
| 2010/0064275 A1* | 3/2010 | Akkiraju | ............ | G06F 8/34 717/104 |
| 2010/0077386 A1* | 3/2010 | Akkiraju | ............ | G06F 8/36 717/136 |
| 2016/0328644 A1* | 11/2016 | Lin | ............ | G06N 3/084 |
| 2019/0286972 A1* | 9/2019 | El Husseini | ............ | G06N 3/063 |
| 2020/0050918 A1* | 2/2020 | Chen | ............ | G06F 9/30014 |
| 2020/0380357 A1* | 12/2020 | Yao | ............ | G06N 3/084 |
| 2021/0042621 A1* | 2/2021 | Zhao | ............ | G06N 5/046 |
| 2021/0097391 A1* | 4/2021 | Zhao | ............ | G06N 3/08 |
| 2021/0117859 A1* | 4/2021 | Rogers | ............ | H04L 41/0836 |
| 2022/0012575 A1* | 1/2022 | Fok | ............ | G06F 9/3802 |
| 2023/0214638 A1* | 7/2023 | Chang | ............ | G06N 3/063 706/41 |

FOREIGN PATENT DOCUMENTS

| | | | | |
|---|---|---|---|---|
| CN | 106331858 A | 1/2017 | | |
| CN | 106650922 A | 5/2017 | | |
| CN | 109492241 A | 3/2019 | | |
| EP | 3614259 A1 * | 2/2020 | ............... | G06F 7/00 |
| WO | WO-2018192500 A1 * | 10/2018 | ............... | G06F 7/00 |
| WO | WO-2019128752 A1 * | 7/2019 | ............... | G06N 3/063 |
| WO | WO-2019200548 A1 * | 10/2019 | ............... | G06F 8/41 |
| WO | WO-2019216938 A1 * | 11/2019 | ............... | G06F 8/36 |

OTHER PUBLICATIONS

Machine Translation of Chinese Patent Application CN 112016668 A, 2020. (Year: 2020).*
Machine Translation of Chinese Patent Application CN 109993288 A, 2019. (Year: 2019).*
Machine Translation of Chinese Patent Application CN 109376852 A, 2019. (Year: 2019).*
'Extracting Rules from Artificial Neural Networks with Distributed Representations' by Sebastian Thrun, Part of Advances in Neural Information Processing Systems 7 (NIPS 1994). (Year: 1994).*
'An ontology framework for developing platformindependent knowledge-based engineering systems in the aerospace industry' by I.O. Sanya et al., May 23, 2014. (Year: 2014).*
'A Case for Neuromorphic ISAs' by Atif Hashmi et al., copyright ACM, 2011. (Year: 2011).*
Machine Translation of CN 113190345 A, 2021. (Year: 2021).*
'Cambricon: An Instruction Set Architecture for Neural Networks' by Liu et al., 2016 ACM/IEEE 43rd Annual International Symposium on Computer Architecture. (Year: 2016).*
Machine Translation of WIPO Publication WO 2022039334 A1, 2022. (Year: 2022).*
Machine Translation of Chinese Patent Application CN 113269320 A, 2020. (Year: 2020).*
Machine Translation of Chinese Patent Application CN 113313242 A, 2020. (Year: 2020).*
Machine Translation of Chinese Patent Application CN 113642721 A, 2020. (Year: 2020).*
Machine Translation of Chinese Patent Application CN 113705799 A, 2020. (Year: 2020).*
Machine Translation of Chinese Patent Application CN 113705800 A, 2020. (Year: 2020).*
Machine Translation of Chinese Patent Application CN 116542325 A, 2023. (Year: 2023).*
"Analysis and Design of Tobacco Logistics Warehouse Management System Based on J2EE", Chinese Master's Theses Full-text Database Information Science and Technology, vol. 1, Mar. 15, 2016, 8 pages.
CN201810913895.6—Second Office Action dated Oct. 14, 2019, 17 pages.
CN202010147559.2—Office Action dated Feb. 28, 2023. (With Brief English explanation).
EP19790111.9—Communication pursuant to Article 94(3) EPC dated Jun. 1, 2022, 63 pages.
PCT/CN2019/080510—International Search Report and Written Opinion dated Jul. 8, 2019, 15 pages.

* cited by examiner

MODEL CONVERSION METHOD, DEVICE, COMPUTER EQUIPMENT, AND STORAGE MEDIUM

CROSS-REFERENCE TO RELATED APPLICATIONS

This application is a continuation of U.S. patent application Ser. No. 16/667,593, filed on Oct. 29, 2019, which is a continuation of International Patent Application No. PCT/CN2019/080510 filed Mar. 29, 2019, which claims the benefit of Chinese Patent Application No. 201810913895.6 filed Aug. 10, 2018, the entire contents of the above-referenced applications are hereby expressly incorporated herein by reference in their entirety

TECHNICAL FIELD

The present disclosure relates to the field of computer technology, and specifically to a model conversion method, a device, computer equipment, and a storage medium.

BACKGROUND ART

With the development of artificial intelligence technology, deep learning can be seen everywhere now and has become indispensable. Many extensible deep learning systems, such as TensorFlow, MXNet, Caffe and PyTorch, have emerged therefrom. The deep learning systems can be used for providing various neural network models or other machine learning models that can be run on a processor such as CPU or GPU. When neural network models and other machine learning models need to be run on different processors, they are often required to be converted.

A traditional method of conversion is as follows: developers configure multiple different conversion models for a neural network model, and the multiple conversion models can be applied to different processors; in practical terms, computer equipment needs to receive a neural network model and multiple corresponding conversion models at the same time, then users are required to select one model from the multiple models according to the type of the computer equipment so that the neural network model can be run on the computer equipment. However, the conversion method can have large data input and a large amount of data processing, which can easily lead to a situation where the memory capacity and the processing limit of computer equipment are exceeded, the processing speed of the computer equipment decreases, and the computer equipment malfunctions.

SUMMARY

In view of this situation, aiming at the above-mentioned technical problem, it is necessary to provide a model conversion method, a device, computer equipment, and a storage medium that can be able to reduce data input and data processing of computer equipment, as well as improve the processing speed of the computer equipment.

The disclosure provides a model conversion method. The model conversion method include: obtaining an initial offline model and hardware attribute information of computer equipment; determining whether model attribute information of the initial offline model matches the hardware attribute information of the computer equipment according to the initial offline model and the hardware attribute information of the computer equipment; and if the model attribute information of the initial offline model does not match the hardware attribute information of the computer equipment, converting the initial offline model to a target offline model that matches the hardware attribute information of the computer equipment according to the hardware attribute information of the computer equipment and a preset model conversion rule. According to some embodiments, the converting the initial offline model to the target offline model that matches the hardware attribute information of the computer equipment according to the hardware attribute information of the computer equipment and the preset model conversion rule include: determining model attribute information of the target offline model according to the hardware attribute information of the computer equipment; selecting a model conversion rule as a target model conversion rule from a plurality of the preset model conversion rules according to the model attribute information of the initial offline model and the model attribute information of the target offline model; and converting the initial offline model to the target offline model according to the model attribute information of the initial offline model and the target model conversion rule.

According to some embodiments, the selecting a model conversion rule as the target model conversion rule from the plurality of the preset model conversion rules according to the model attribute information of the initial offline model and the model attribute information of the target offline model further include: selecting more than one applicable model conversion rules from the plurality of the preset model conversion rules according to the model attribute information of the initial offline model and the model attribute information of the target offline model; and prioritizing the more than one applicable model conversion rules, and serving an applicable model conversion rule with a highest priority as the target model conversion rule.

According to some embodiments, the prioritizing the more than one applicable model conversion rules further include: obtaining process parameters of using each of the applicable model conversion rules to convert the initial offline model to the target offline model, respectively, where the process parameters can include one or more of conversion speed, power consumption, memory occupancy rate, and magnetic disk I/O occupancy rate; and prioritizing the more than one applicable model conversion rules according to the process parameters of the respective applicable model conversion rules.

According to some embodiments, the model attribute information of the initial offline model, the model attribute information of the target offline model, and the applicable model conversion rules be stored in one-to-one correspondence.

According to some embodiments, the determining whether the model attribute information of the initial offline model matches the hardware attribute information of the computer equipment according to the initial offline model and the hardware attribute information of the computer equipment include: according to the model attribute information of the initial offline model and the hardware attribute information of the computer equipment, if the computer equipment is determined as being able to support the running of the initial offline model, determining that the model attribute information of the initial offline model matches the hardware attribute information of the computer equipment; and according to the model attribute information of the initial offline model and the hardware attribute information of the computer equipment, if the computer equipment is determined as not being able to support the running of the initial offline model, determining that the model attribute information of the initial offline model does not match the hardware attribute information of the computer equipment.

According to some embodiments, the obtaining the initial offline model further include: obtaining the initial offline model and the hardware attribute information of the computer equipment via an application in the computer equipment.

According to some embodiments, the method further include: storing the target offline model in a first memory or a second memory of the computer equipment.

According to some embodiments, the method further include: obtaining the target offline model, and running the target offline model; the target offline model can include network weights and instructions corresponding to respective offline nodes in an original network, as well as interface data among the respective offline nodes and other compute nodes in the original network.

According to some embodiments, a model conversion device is disclosed. The device include: an obtaining unit configured to obtain an initial offline model and hardware attribute information of computer equipment; a determination unit configured to determine whether model attribute information of the initial offline model matches the hardware attribute information of the computer equipment according to the initial offline model and the hardware attribute information of the computer equipment; and a conversion unit configured to, if the model attribute information of the initial offline model does not match the hardware attribute information of the computer equipment, convert the initial offline model to a target offline model that matches the hardware attribute information of the computer equipment according to the hardware attribute information of the computer equipment and a preset model conversion rule. The present disclosure provides computer equipment, where the computer equipment can include a memory and a processor. A computer program can be stored in the memory. The steps of the method in any example mentioned above can be implemented when the processor executes the computer program.

According to some embodiments, the processor can include a computation unit and a controller unit, where the computation unit can further include a primary processing circuit and a plurality of secondary processing circuits; the controller unit can be configured to obtain data, a machine learning model, and an operation instruction; the controller unit can further be configured to parse the operation instruction to obtain a plurality of computation instructions, and send the plurality of computation instructions and the data to the primary processing circuit; the primary processing circuit can be configured to perform preprocessing on the data as well as data and computation instructions transmitted among the primary processing circuit and the plurality of secondary processing circuits; the plurality of secondary processing circuits can be configured to perform intermediate computation in parallel according to data and computation instructions transmitted by the primary processing circuit to obtain a plurality of intermediate results, and transmit the plurality of intermediate results to the primary processing circuit; and the primary processing circuit can further be configured to perform postprocessing on the plurality of intermediate results to obtain an operation result of the operation instruction.

The present disclosure further provides a computer readable storage medium. A computer program can be stored in the computer readable storage medium. The steps of the method in any example mentioned above can be implemented when a processor executes the computer program.

Regarding the model conversion method, the device, the computer equipment, and the storage medium, by merely receiving an initial offline model, the computer equipment can be able to convert the initial offline model into a target offline model according to a preset model conversion rule and hardware attribute information of the computer equipment without the need of obtaining multiple different versions of the initial offline models matching with different computer equipment. Data input of the computer equipment can thus be greatly reduced, problems such as excessive data input exceeding a memory capacity of the computer equipment can be avoided, and normal functioning of the computer equipment can be ensured. In addition, the model conversion method can reduce an amount of data processing of the computer equipment, and can thus improve the processing speed and processing efficiency of the computer equipment as well as reduce power consumption. Moreover, the model conversion method can have a simple process and can require no manual intervention. With a relatively high level of automation, the model conversion method can be easy to use.

DETAILED DESCRIPTION

In order to make the purposes, technical schemes, and technical effects of the present disclosure clearer, the present disclosure will be described hereinafter with reference to the accompanied drawings and examples. It should be understood that the examples described herein are merely used for explaining the present disclosure, rather than limiting the present disclosure.

Figure 1:
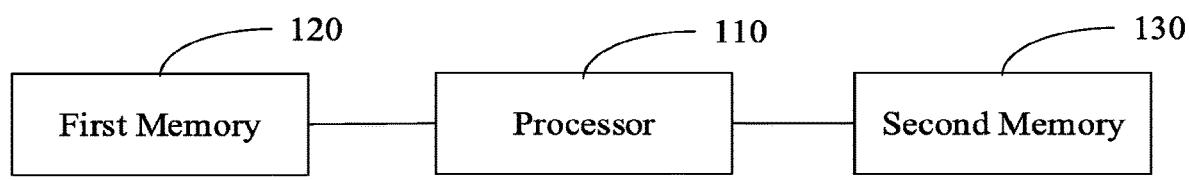
FIG. 1 is a block diagram of a computer equipment, according to some embodiments.

FIG. 1 is a block diagram of a computer equipment, according to some embodiments. The computer equipment can be a mobile terminal such as a mobile phone or a tablet, or a terminal such as a desktop computer, a board, or a cloud server. The computer equipment can be applied to robots, printers, scanners, traffic recorders, navigators, cameras, video cameras, projectors, watches, portable storage devices, wearable devices, transportation, household appliances and/or medical equipment. The transportation can include airplanes, ships, and/or vehicles. The household electrical appliances can include televisions, air conditioners, microwave ovens, refrigerators, electric rice cookers, humidifiers, washing machines, electric lamps, gas cookers, and range hoods. The medical equipment can include nuclear magnetic resonance spectrometers, B-ultrasonic scanners, and/or electrocardiographs.

The computer equipment can include a processor 110, and a first memory 120 and second memory 130 that can be connected to the processor 110. Alternatively, the processor 110 can be a general processor, such as a CPU (Central Processing Unit), a GPU (Graphics Processing Unit), or a DSP (Digital Signal Processing). The processor 110 can also be a network model processor such as an IPU (Intelligence Processing Unit). The processor 110 can further be an instruction set processor, a related chipset, a dedicated microprocessor such as an ASIC (Application Specific Integrated Circuit), an onboard memory for buffering, or the like.

Figure 2:
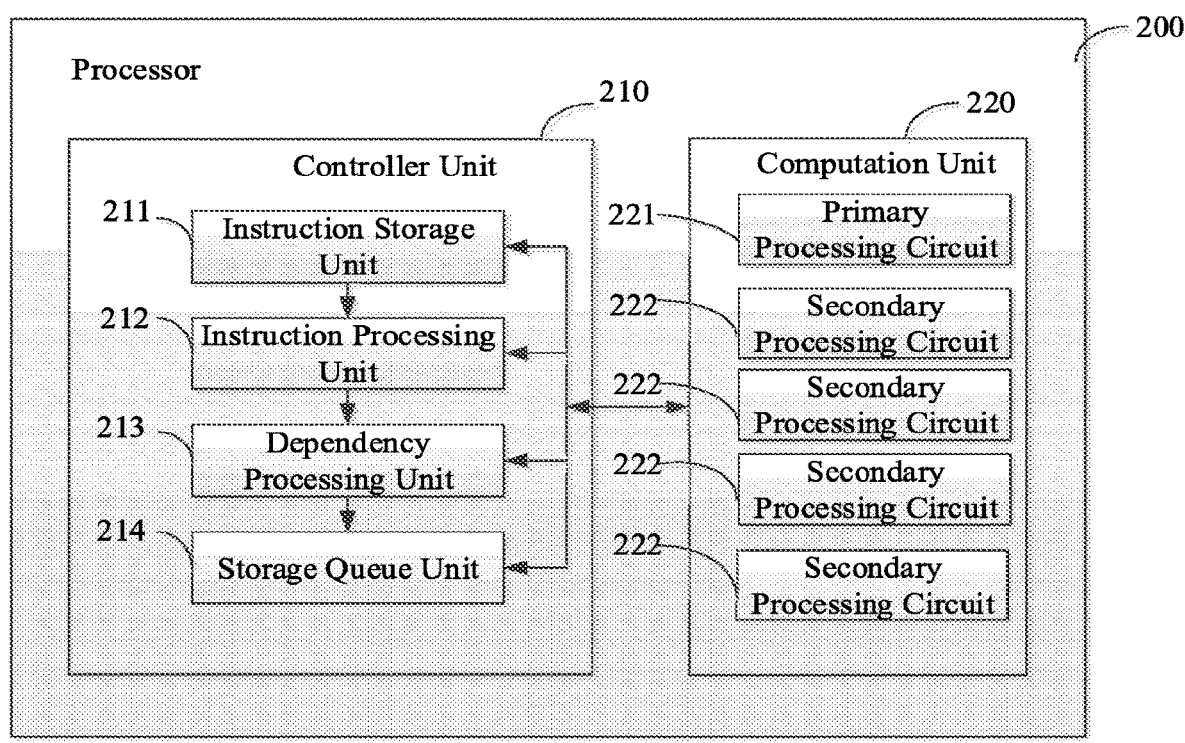
FIG. 2 is a block diagram of a processor according to FIG. 1, according to some embodiments.

FIG. 2 is a block diagram of a processor according to FIG. 1, according to some embodiments. As shown in FIG. 2, the processor 110 can include a controller unit 210 and a computation unit 220, where the controller unit 210 can be connected to the computation unit 220, and the computation unit 220 can include a primary processing circuit 221 and a plurality of secondary processing circuits 222. The controller unit 210 can be configured to obtain data, a machine learning model, and an operation instruction. The machine learning model can specifically include a network model, where the network model can be a neural network model and/or a non-neural network model. The controller unit 210 can be further configured to parse a received operation instruction to obtain a plurality of computation instructions, and send the plurality of computation instructions and data to the primary processing circuit. The primary processing circuit can be configured to perform preprocessing on the data as well as data and computation instructions transmitted among the primary processing circuit and the plurality of secondary processing circuits. The plurality of secondary processing circuits can be configured to perform intermediate computation in parallel according to data and computation instructions transmitted by the primary processing circuit to obtain a plurality of intermediate results, and transmit the plurality of intermediate results to the primary processing circuit; the primary processing circuit can be further configured to perform post-processing on the plurality of intermediate results to obtain an operation result of the operation instruction.

According to some embodiments, the controller unit 210 can include an instruction storage unit 211, an instruction processing unit 212, and a storage queue unit 214; the instruction storage unit 211 can be configured to store an operation instruction associated with a machine learning model; the instruction processing unit 212 can be configured to parse an operation instruction to obtain a plurality of computation instructions; the storage queue unit 214 can be configured to store an instruction queue where the instruction queue can include: a plurality of computation instructions or operation instructions that are to be performed and are sorted in sequential order. According to some embodiments, the controller unit 210 can further include a dependency processing unit 213. The dependency processing unit 213 can be configured to, when a plurality of computation instructions exist, determine whether a first computation instruction and a zero-th computation instruction preceding the first computation instruction are associated, for instance, if the first computation instruction and the zero-th computation instruction are associated, the first computation instruction can be buffered in the instruction storage unit, and after the zero-th computation instruction is completed, the first computation instruction can be fetched from the instruction storage unit and transmitted to the computation unit. According to some embodiments, the dependency processing unit 213 can fetch a first memory address of required data (e.g., a matrix) of the first computation instruction according to the first computation instruction, and can fetch a zero-th memory address of a required matrix of the zero-th computation instruction according to the zero-th computation instruction. According to some embodiments, if there is overlap between the first memory address and the zero-th memory address, then it can be determined that the first computation instruction and the zero-th computation instruction are associated; if there is no overlap between the first memory address and the zero-th memory address, then it can be determined that the first computation instruction and the zero-th computation instruction are not associated.

Figure 3:
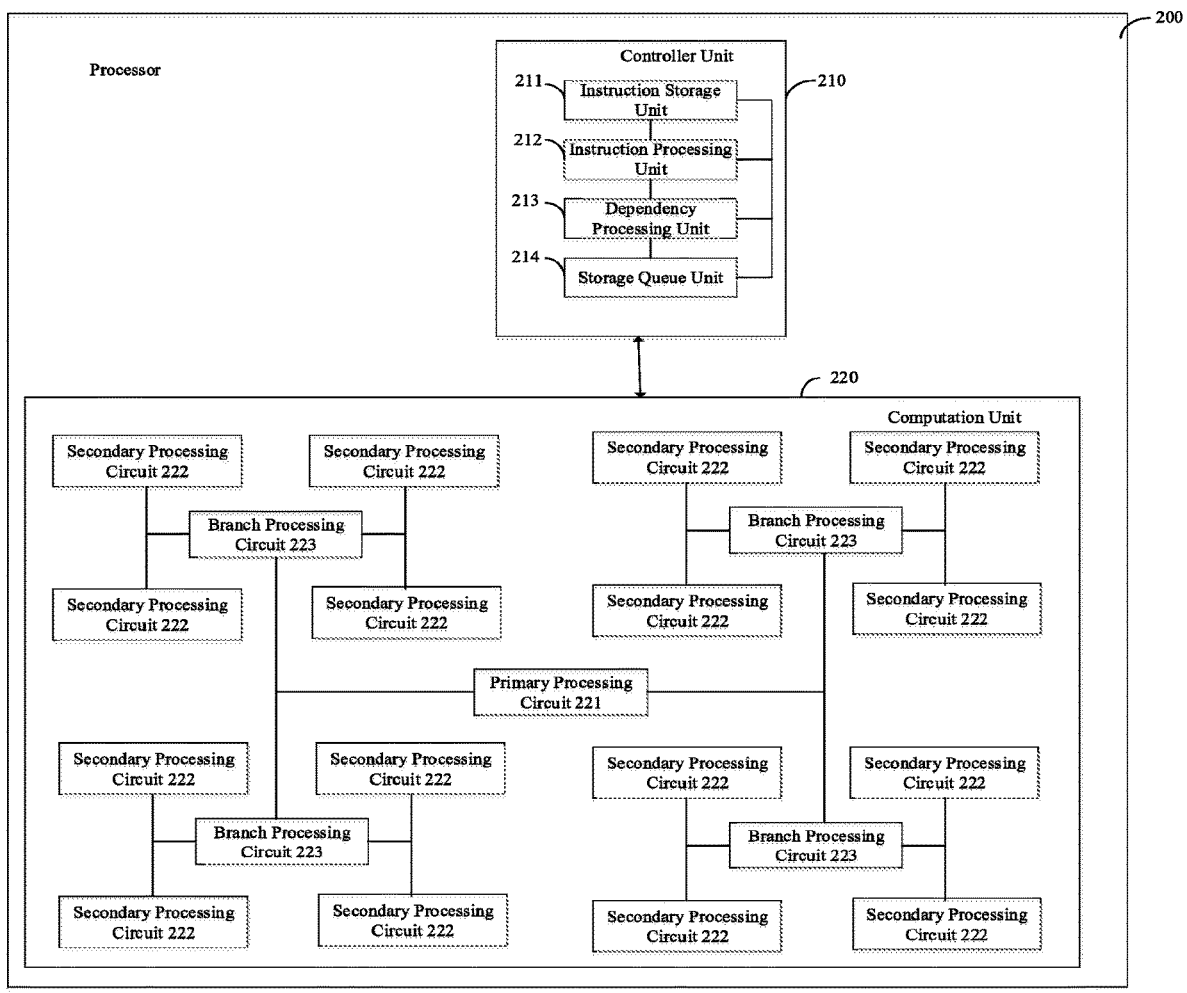
FIG. 3 is a block diagram of a processor according to FIG. 1, according to some embodiments.

FIG. 3 is a block diagram of a processor according to FIG. 1, according to some embodiments. According to some embodiments, as shown in FIG. 3, the computation unit 220 can further include a branch processing circuit 223, where the primary processing circuit 221 can be connected to the branch processing circuit 223, and the branch processing circuit 223 can be connected to the plurality of secondary processing circuits 222; the branch processing circuit 223 can be configured to forward data or instructions among the primary processing circuit 221 and the secondary processing circuits 222. According to some embodiments, the primary processing circuit 221 can be configured to divide one input neuron into a plurality of data blocks, and send at least one data blocks of the plurality of data blocks, a weight, and at least one computation instruction of the plurality of computation instructions to the branch processing circuit; the branch processing circuit 223 can be configured to forward the data block, the weight, and the computation instruction among the primary processing circuit 221 and the plurality of secondary processing circuits 222; the plurality of secondary processing circuits 222 can be configured to perform computation on the received data block and weight according to the computation instruction to obtain an intermediate result, and transmit the intermediate result to the branch processing circuit 223; the primary processing circuit 221 can further be configured to perform postprocessing on the intermediate result transmitted by the branch processing circuit to obtain an operation result of the operation instruction, and transmit the operation result to the controller unit.

Figure 4:
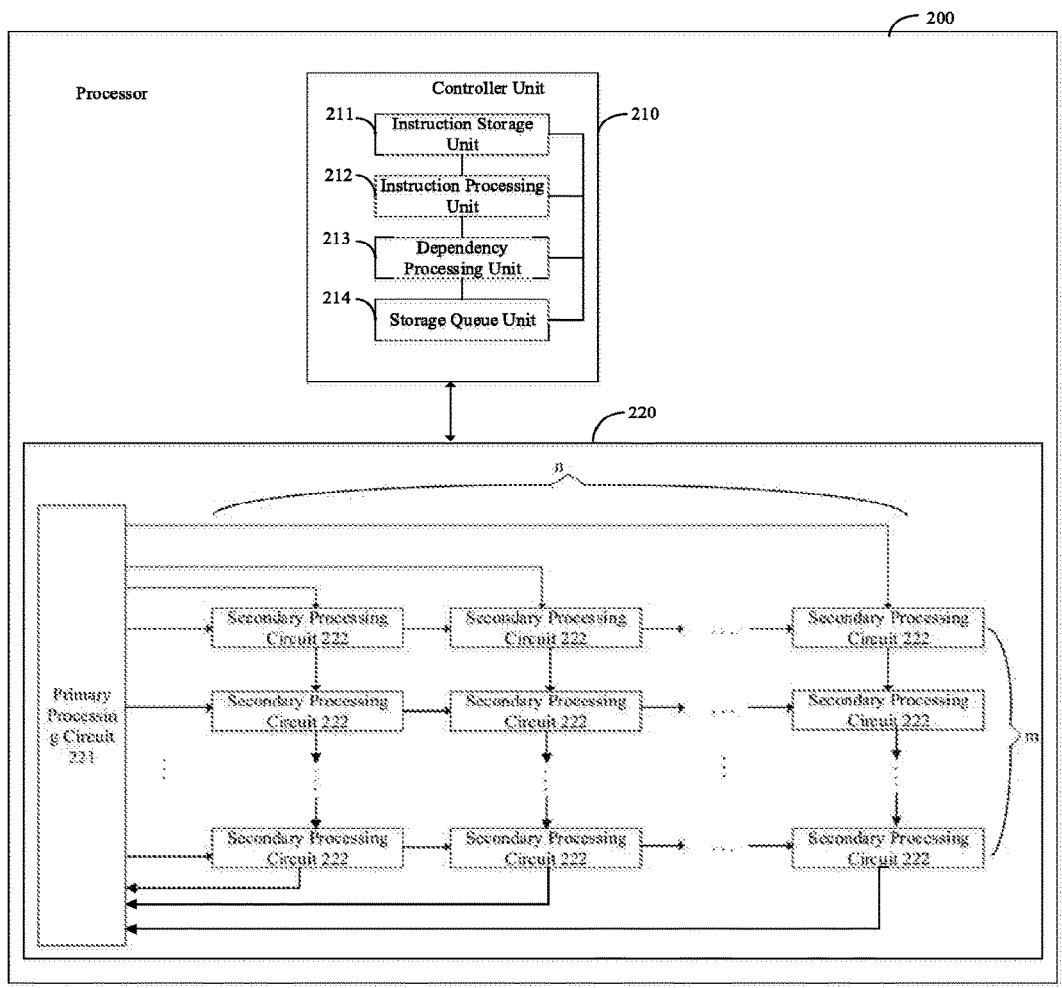
FIG. 4 is a block diagram of a processor according to FIG. 1, according to some embodiments.

FIG. 4 is a block diagram of a processor according to FIG. 1, according to some embodiments. According to some embodiments, as shown in FIG. 4, the computation unit 220 can include one primary processing circuit 221 and a plurality of secondary processing circuits 222. The plurality of secondary processing circuits can be arranged in the form of an array. Each of the secondary processing circuits can be connected to other adjacent secondary processing circuits, and the primary processing circuit can be connected to k secondary processing circuits of the plurality of secondary processing circuits, where the k secondary processing circuits can be: n secondary processing circuits in a first line, n secondary processing circuits in an m-th line, and m secondary processing circuits in a first column. It should be noted that, k secondary processing circuits shown in FIG. 4 can only include n secondary processing circuits in a first line, n secondary processing circuits in an m-th line, and m secondary processing circuits in a first column. In other words, the k secondary processing circuits can be secondary processing circuits that are connected to the primary processing circuit directly. The k secondary processing circuits can be configured to forward data and instructions among the primary processing circuit and the plurality of secondary processing circuits.

According to some embodiments, the primary processing circuit 221 can include one or any combination of a conversion processing circuit, an activation processing circuit, and an addition processing circuit. The conversion processing circuit can be configured to perform an interconversion between a first data structure and a second data structure (e.g., an interconversion between continuous data and discrete data) on a received data block or intermediate result of the primary processing circuit, or the conversion processing circuit can be configured to perform an interconversion between a first data type and a second data type (e.g., an interconversion between a fixed point type and a floating point type) on a received data block or intermediate result of the primary processing circuit. The activation processing circuit can be configured to perform activation operation on data in the primary processing circuit. The addition processing circuit can be configured to perform addition operation or accumulation operation.

A computer program can be stored in the first memory 120 or the second memory 130. The computer program can be used for implementing a model conversion method provided in an example of the disclosure. Specifically, the conversion method can be used for, if model attribute information of an initial offline model received by computer equipment does not match hardware attribute information of the computer equipment, converting the initial offline model to a target offline model that matches the hardware attribute information of the computer equipment so that the computer equipment can be able to run the initial offline model. When using the model conversion method, data input of a computer equipment can be reduced, and an initial offline model can be automatically converted to a target offline model without any manual intervention. The method can have a simple process and high conversion efficiency. Further, the computer program can also be able to implement an offline model generation method.

According to some embodiments, the first memory 120 can be configured to store related data in running of a network model, such as network input data, network output data, network weights, instructions, and the like. The first memory 120 can be an internal memory, such as a volatile memory including a buffer. The second memory 130 can be configured to store an offline model corresponding to a network model, and for instance, the second memory 130 can be a nonvolatile memory.

Working principles of the above-mentioned computer equipment can be consistent with an implementing process of each step of a model conversion method below. When the processor 110 of the computer equipment perform the computer program stored in the first memory 120, each of the steps of the model conversion method can be implemented, for details, see the description below.

According to some embodiments, the computer equipment can further include a processor and a memory, and the computer equipment can furthermore include a processor and a memory that can be connected to the processor. The processor can be a processor shown in FIGS. 2-4, for a specific structure of the processor, see the description above about the processor 110. The memory can include a plurality of storage units. For instance, the memory can include a first storage unit, a second storage unit, and a third storage unit. The first storage unit can be configured to store a computer program, where the computer program can be used for implementing a model conversion method provided in an example of the disclosure. The second memory unit can be configured to store related data in running of an original network. The third memory can be configured to store an offline model corresponding to the original network, a target offline model corresponding to the offline model, and a preset model conversion rule, and the like. Further, a count of storage units included by the memory can be greater than three, which is not limited here.

Figure 5:
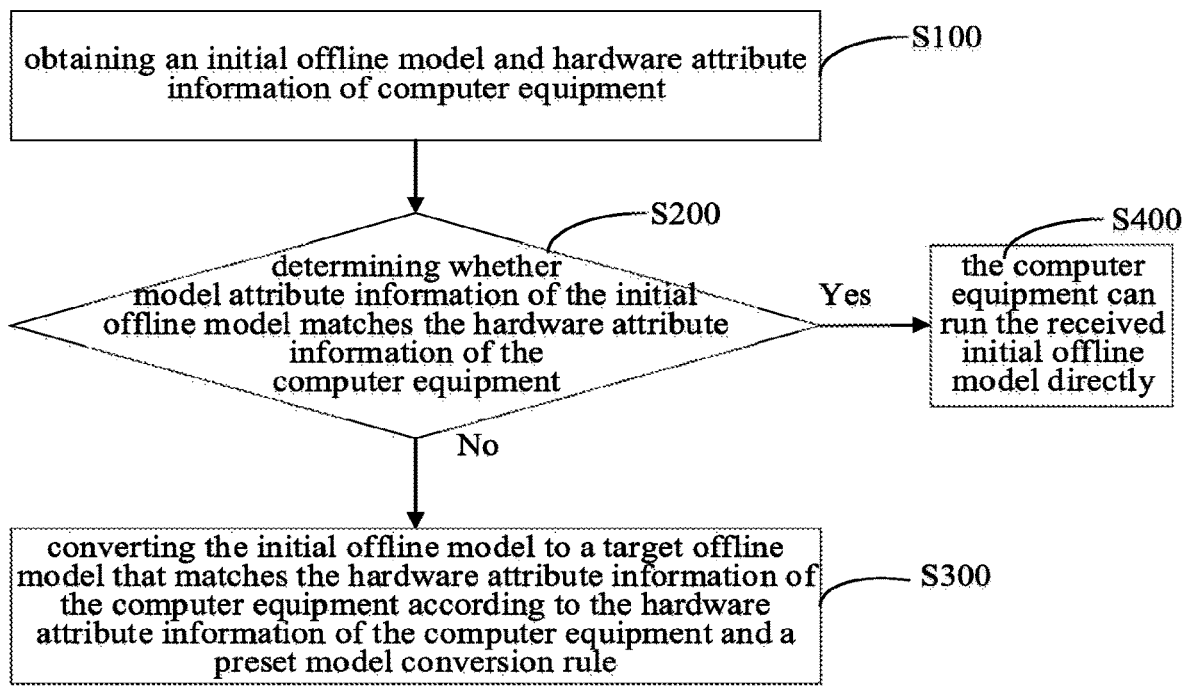
FIG. 5 is a flowchart of a model conversion method, according to some embodiments.

FIG. 5 is a flowchart of a model conversion method, according to some embodiments. According to some embodiments, as shown in FIG. 5, the present disclosure provides a model conversion method that can be used in the above-mentioned computer equipment. The model conversion method can be configured to, if model attribute information of an initial offline model received by computer equipment does not match hardware attribute information of the computer equipment, convert the initial offline model to a target offline model that matches the hardware attribute information of the computer equipment so that the computer equipment can be able to run the initial offline model. According to some embodiments, the method can include steps: S100, obtaining an initial offline model and hardware attribute information of computer equipment; S200, determining whether model attribute information of the initial offline model matches the hardware attribute information of the computer equipment according to the initial offline model and the hardware attribute information of the computer equipment; and S300, in the case when the model attribute information of the initial offline model does not match the hardware attribute information of the computer equipment, converting the initial offline model to a target offline model that matches the hardware attribute information of the computer equipment according to the hardware attribute information of the computer equipment and a preset model conversion rule.

According to some embodiments, the initial offline model refers to an offline model obtained directly by the computer equipment, and the initial offline model can be stored in the second memory 130. The offline model can include necessary network structure information, such as network weights and instructions of respective compute nodes in an original network, where the instructions can be configured to represent computational functions that the respective compute nodes can be configured to perform, according to some embodiments, the instructions can be executed by the processor directly. According to some embodiments, the instructions are machine code. The instructions can specifically include computational attributes of the respective compute nodes in the original network, connections among the respective compute nodes, and other information. The original network can be a network model, such as a neural network model, see FIG. 9 for reference. Thus, the computer equipment can realize a computational function of the original network by running the offline model corresponding to the original network without the need of performing operation, such as compiling, repeatedly on the same original network. Time for running the network by the processor can be reduced, and processing speed and efficiency of the processor can be improved. Alternatively, the initial offline model of the example can be an offline model generated according to the original network directly, and can also be an offline model obtained through an offline model having other model attribute information being converted for once or a plurality of times, which is not confined here.

S200, determining whether model attribute information of the initial offline model matches the hardware attribute information of the computer equipment according to the initial offline model and the hardware attribute information of the computer equipment.

According to some embodiments, the model attribute information of the initial offline model can include a data structure, a data type, and the like, of the initial offline model. For instance, the model attribute information can include an arrangement manner of each network weight and instruction, a type of each network weight, a type of each instruction, and the like, in the initial offline model. The hardware attribute information of the computer equipment can include an equipment model of the computer equipment, a data type (e.g., fixed point, floating point, and the like) and a data structure that the computer equipment can be able to process. The computer equipment can be configured to determine whether the computer equipment is able to support running of the initial offline model (in other words, whether the computer equipment is able to run the initial offline model) according to the model attribute information of the initial offline model and the hardware attribute information of the computer equipment, and then determine whether the model attribute information of the initial offline model matches the hardware attribute information of the computer equipment.

According to some embodiments, if the computer equipment is able to support the running of the initial offline model, it can be determined that the model attribute information of the initial offline model matches the hardware attribute information of the computer equipment. If the computer equipment is not able to support the running of the initial offline model, it can be determined that the model attribute information of the initial offline model does not match the hardware attribute information of the computer equipment.

According to some embodiments, the computer equipment can determine the data type and the data structure that the computer equipment can be able to process according to the hardware attribute information, and determine the data type and the data structure of the initial offline model according to the model attribute information of the initial offline model. If the computer equipment determines that the computer equipment is able to support the data type and the data structure of the initial offline model according to the hardware attribute information of the computer equipment and the model attribute information of the initial offline model, the computer equipment can determine that the model attribute information of the initial offline model matches the hardware attribute information of the computer equipment. If the computer equipment determines that the computer equipment is not able to support the data type and the data structure of the initial offline model according to the hardware attribute information of the computer equipment and the model attribute information of the initial offline model, the computer equipment can determine that the model attribute information of the initial offline model does not match the hardware attribute information of the computer equipment.

According to some embodiments, if the model attribute information of the initial offline model does not match the hardware attribute information of the computer equipment, S300 can be performed, the initial offline model can be converted to a target offline model that matches the hardware attribute information of the computer equipment according to the hardware attribute information of the computer equipment and a preset model conversion rule.

According to some embodiments, if the model attribute information of the initial offline model does not match the hardware attribute information of the computer equipment, which indicates that the computer equipment cannot be able to support the running of the initial offline model, the initial offline model can need to be converted so that the computer equipment can be able to use the initial offline model to realize corresponding computation. In other words, if the model attribute information of the initial offline model does not match the hardware attribute information of the computer equipment, the initial offline model can be converted to the target offline model that matches the hardware attribute information of the computer equipment according to the hardware attribute information of the computer equipment and the preset model conversion rule, where model attribute information of the target offline model can match the hardware attribute information of the computer equipment, and the computer equipment can be able to support running of the target offline model. As stated above, the target offline model can also include the necessary network structure information, such as the network weights and the instructions of the respective compute nodes in the original network.

According to some embodiments, the preset model conversion rule can be pre-stored in a first memory or a second memory in the computer equipment. If the model attribute information of the initial offline model does not match the hardware attribute information of the computer equipment, then the computer equipment can obtain a corresponding model conversion rule from the first memory or the second memory to convert the initial offline model to the target offline model. According to some embodiments, a count of the preset model conversion rule can be greater than one, and the more than one model conversion rules can be stored with the initial offline model and the target offline model in one-to-one correspondence. According to some embodiments, the initial offline model, the target offline model, and the preset model conversion rules can be stored correspondingly via a mapping table. According to some embodiments, the model attribute information of the initial offline model, the model attribute information of the target offline model, and applicable model conversion rules can be stored in one-to-one correspondence.

If the model attribute information of the initial offline model matches the hardware attribute information of the computer equipment, then S400 can be performed, the computer equipment can run the received initial offline model directly. In other words, the computer equipment can perform computation according to the network weights and the instructions included in the initial offline model, so as to realize the computational function of the original network. According to some embodiments, if the model attribute information of the initial offline model matches the hardware attribute information of the computer equipment, which indicates that the computer equipment can be able to support the running of the initial offline model, the initial offline model cannot need to be converted, and the computer equipment can be able to run the initial offline model. It should be understood that in the present example, running the initial offline model directly refers to that, using the initial offline model to run a corresponding machine learning algorithm (e.g., a neural network algorithm) of the original network, and to realize a target application (e.g., an artificial intelligence application such as speech recognition) of the algorithm by performing forward computation.

Regarding the model conversion method according to the example of the disclosure, by merely receiving an initial offline model, the computer equipment can convert the initial offline model into the target offline model according to the preset model conversion rule and the hardware attribute information of the computer equipment without the need of obtaining multiple different versions of the initial offline models matching with different computer equipment. Data input of the computer equipment can thus be greatly reduced, problems such as excessive data input exceeding a memory capacity of the computer equipment can be avoided, and normal functioning of the computer equipment can be ensured. In addition, the model conversion method can reduce an amount of data processing of the computer equipment, and can thus improve the processing speed as well as reduce power consumption. According to some embodiments, the model conversion method can require no manual intervention. With a relatively high level of automation, the model conversion method can be easy to use.

Figure 6:
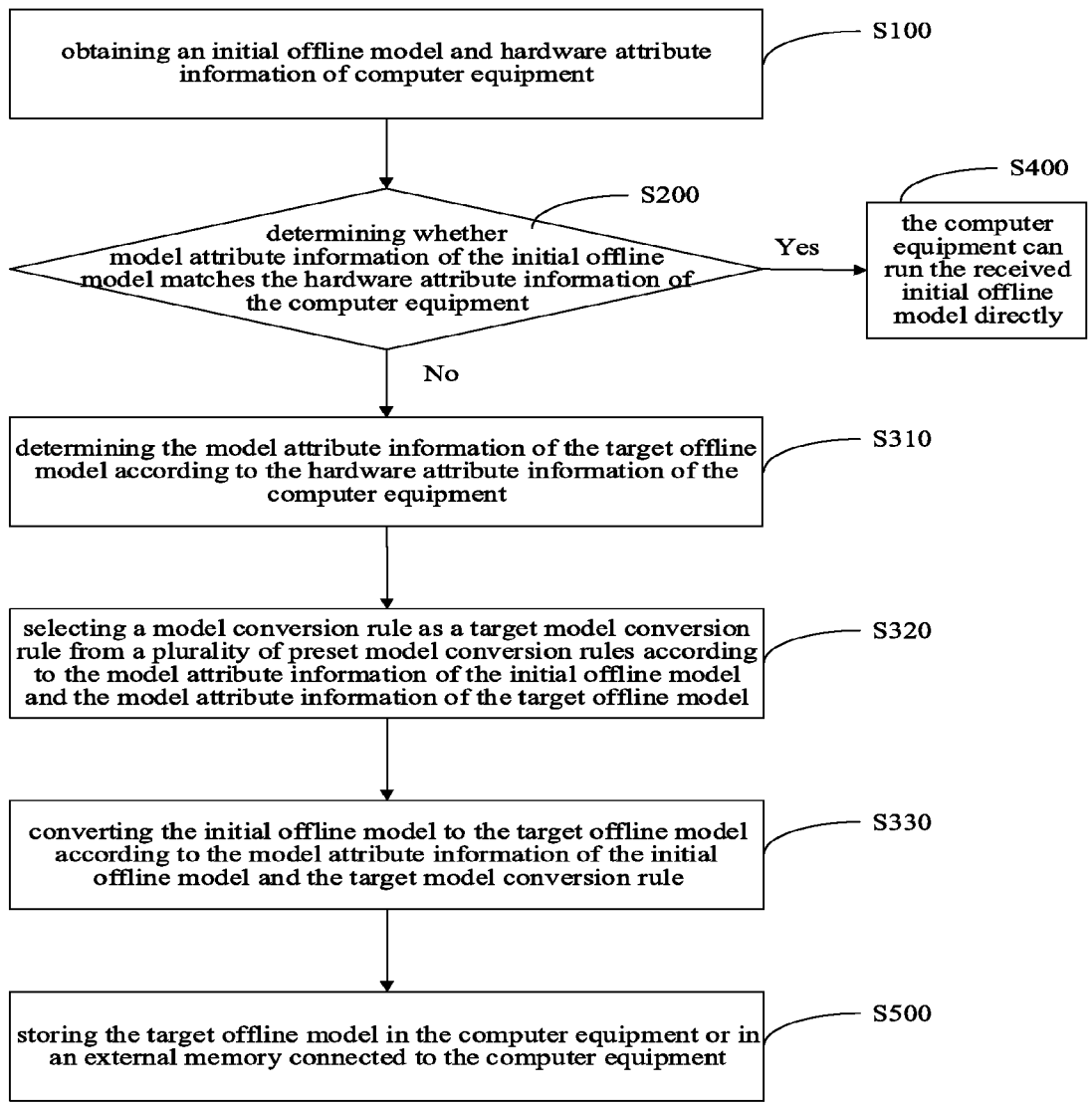
FIG. 6 is a flowchart of a model conversion method, according to some embodiments.

FIG. 6 is a flowchart of a model conversion method, according to some embodiments. According to some embodiments, as shown in FIG. 6, S300 can include the steps of S310, determining the model attribute information of the target offline model according to the hardware attribute information of the computer equipment; S320, selecting a model conversion rule as a target model conversion rule from a plurality of preset model conversion rules according to the model attribute information of the initial offline model and the model attribute information of the target offline model; S330, converting the initial offline model to the target offline model according to the model attribute information of the initial offline model and the target model conversion rule.

Specifically, the computer equipment can determine the data type and the data structure that the computer equipment can be able to support according to the hardware attribute information of the computer equipment, and determine the model attribute information, including the data type and the data structure, of the target offline model. In other words, the computer equipment can determine the model attribute information of the target offline model according to the hardware attribute information of the computer equipment, where the model attribute information of the target offline model can include information, including the data structure and the data type, of the target offline model.

S320, selecting a model conversion rule as a target model conversion rule from a plurality of preset model conversion rules according to the model attribute information of the initial offline model and the model attribute information of the target offline model.

According to some embodiments, since the initial offline model, the target offline model, and the preset model conversion rules are mapped in one-to-one correspondence, the target model conversion rule can be determined according to the model attribute information of the initial offline model and the model attribute information of the target offline model, where the model conversion rules can include a data type conversion method, a data structure conversion method, and the like.

S330, converting the initial offline model to the target offline model according to the model attribute information of the initial offline model and the target model conversion rule.

According to some embodiments, the computer equipment can convert the initial offline model to the target offline model according to a conversion method provided by the target model conversion rule, so that the computer equipment can be able to run the target offline model and perform computation.

According to some embodiments, if there are a plurality of model conversion rules for the initial offline model and the target offline model, the computer equipment can select the target offline model automatically according to a preset algorithm. Specifically, S320 can further include: selecting more than one applicable model conversion rules from the plurality of the preset model conversion rules according to the model attribute information of the initial offline model and the model attribute information of the target offline model; and prioritizing the more than one applicable model conversion rules, and serving an applicable model conversion rule with a highest priority as the target conversion rule.

According to some embodiments, the applicable model conversion rules refers to conversion rules that are able to convert the initial offline model to the target offline model. The case where more than one applicable model conversion rules exist indicates that there can be a plurality of different manners for converting the initial offline model into the target offline model. The manner of prioritizing can be preset, or can be defined by users.

According to some embodiments, the computer equipment can obtain process parameters of the respective applicable model conversion rules, and prioritize the more than one applicable model conversion rules according to the process parameters of the respective applicable model conversion rules. The process parameters can be performance parameters of the computer equipment that are involved when using the model conversion rules to convert the initial offline model to the target offline model. According to some embodiments, the process parameters can include one or more of conversion speed, power consumption, memory occupancy rate, and magnetic disk I/O occupancy rate.

According to some embodiments, the computer equipment can score the respective applicable model conversion rules (e.g., obtaining scores by performing weighted computation on respective reference factors) according to a combination of one or more of the process parameters, including conversion speed, conversion power consumption, memory occupancy rate, and magnetic disk I/O occupancy rate, during the conversion of the initial offline model to the target offline model, and serve an applicable model conversion rule with a highest score as the applicable model conversion rule with the highest priority. In other words, the applicable model conversion rule with the highest score can be used as the target conversion rule. According to some embodiments, S330 can be performed, and the initial offline model can be converted to the target offline model according to the model attribute information of the initial offline model and the target model conversion rule. In this way, a better model conversion rule can be selected by considering performance factors of equipment during a model conversion process, and processing speed and efficiency of the computer equipment can thus be improved.

According to some embodiments, as shown in FIG. 6, the method above can further include:

S500, storing the target offline model in the first memory or the second memory of the computer equipment.

According to some embodiments, the computer equipment can store the obtained target offline model in a local memory (e.g., the first memory) of the computer equipment. According to some embodiments, the computer equipment can further store the obtained target offline model in an external memory (e.g., the second memory) connected to the computer equipment, where the external memory can be a cloud memory or another memory. In this way, when the computer equipment needs to use the target offline model repeatedly, the computer equipment can realize the corresponding computation merely by reading the target offline model directly without the need of repeating the above-mentioned conversion operation.

According to some embodiments, a process that the computer equipment performs the target offline model can include:

Obtaining the target offline model, and running the target offline model to execute the original network. The target offline model can include necessary network structure information, including network weights and instructions corresponding to respective offline nodes in the original network, and interface data among the respective offline nodes and other compute nodes in the original network.

According to some embodiments, when the computer equipment needs to use the target offline model to realize computation, the computer equipment can obtain the target offline model from the first memory or the second memory directly, and perform computation according to the network weights, the instructions, and the like, in the target offline model, so as to realize the computational function of the original network. In this way, when the computer equipment needs to use the target offline model repeatedly, the computer equipment can realize the corresponding computation by merely reading the target offline model without the need of repeating the above-mentioned conversion operation.

It should be understood that in the present example, running the target offline model directly refers to that, using the target off-line model to run a corresponding machine learning algorithm (e.g., a neural network algorithm) of the original network, and realize a target application (e.g., an artificial intelligence application such as speech recognition) of the algorithm by performing forward computation.

According to some embodiments, an application can be installed on the computer equipment. An initial offline model can be obtained via the application on the computer equipment. The application can provide an interface for obtaining the initial offline model from the first memory 120 or an external memory, so that the initial offline model can be obtained via the application. According to some embodiments, the application can further provide an interface for reading hardware attribute information of the computer equipment, so that the hardware attribute information of the computer equipment can be obtained via the application. According to some embodiments, the application can further provide an interface for reading a preset model conversion rule, so that the preset model conversion rule can be obtained via the application.

According to some embodiments, the computer equipment can provide an input/output interface (e.g., an I/O interface), and the like, where the input/output interface can be configured to obtain an initial offline model, or output a target offline model. Hardware attribute information of the computer equipment can be preset to be stored in the computer equipment.

Figure 7:
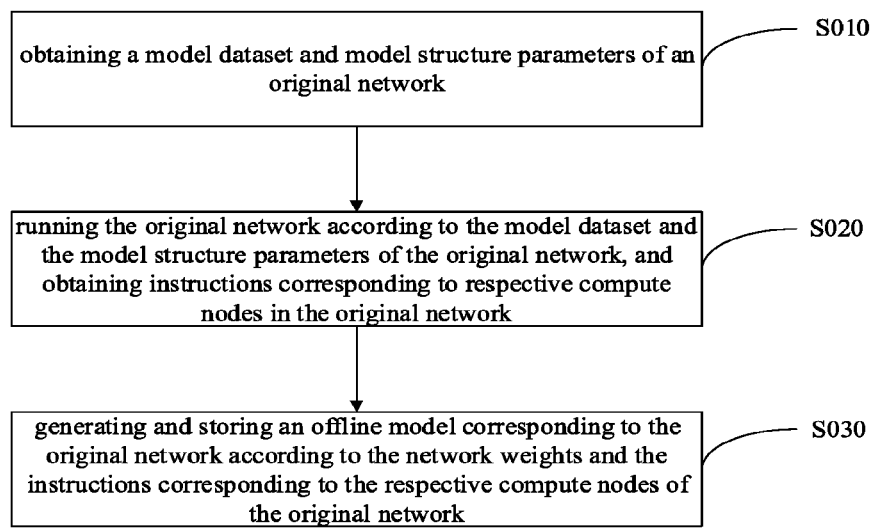
FIG. 7 is a flowchart of an offline model generation method, according to some embodiments.

FIG. 7 is a flowchart of an offline model generation method, according to some embodiments. According to some embodiments, as shown in FIG. 7, an example of the present disclosure further provides a method of generating an offline model according to an original network model. The method can be configured to generate and store an offline model of an original network according to obtained related data of the original network, so that when a processor runs the original network again, the processor can run the offline model corresponding to the original network directly without the need of performing operation, such as compiling, repeatedly on the same original network. Time for running the network by the processor can thus be reduced, and then processing speed and efficiency of the processor can be improved. The original network can be a network model such as a neural network or a non-neural network. For instance, the original network can be a network shown in FIG. 9. According to some embodiments, the method above can include: S010, obtaining a model dataset and model structure parameters of an original network. S020, running the original network according to the model dataset and the model structure parameters of the original network, and obtaining instructions corresponding to the respective compute nodes in the original network. S030, generating an offline model corresponding to the original network according to the network weights and the instructions corresponding to the respective compute nodes of the original network, and storing the offline model corresponding to the original network in a nonvolatile memory (or a database).

Figure 9:
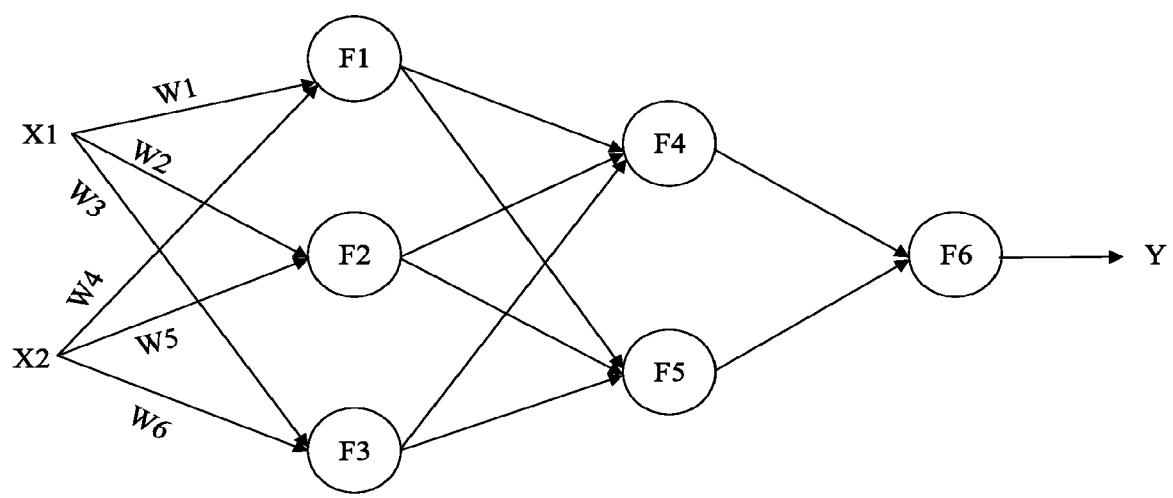
FIG. 9 is a diagram of a network structure of a network model, according to some embodiments.

According to some embodiments, a processor of computer equipment can obtain the model dataset and the model structure parameters of the original network, and can obtain a diagram of network structure of the original network according to the model dataset and the model structure parameters of the original network. The model dataset can include data such as network weights corresponding to respective compute nodes in the original network. According to some embodiments, $W1~W6$ in a neural network shown in FIG. 9 are used for representing network weights of compute nodes. The model structure parameters can include connections among a plurality of compute nodes in the original network, and computational attributes of the respective compute nodes, where the connections among the compute nodes can be used for indicating whether data is transmitted among the compute nodes. According to some embodiments, when a data stream is transmitted among a plurality of compute nodes, the plurality of compute nodes can have connections among them. Further, the connections among the compute nodes can include an input relation, an output relation, and the like. According to some embodiments, as shown in FIG. 9, if output of compute node F1 serves as input of compute nodes F4 and F5, then the compute node F1 can have a connection with the compute node F4, and the compute node F1 can have a connection relation with the compute node F5. According to some embodiments, if no data is transmitted between the compute node F1 and compute node F2, then the compute node F1 can have no connection with the compute node F2.

The computational attributes of the respective computes node can include a computational type and computation parameters corresponding to a compute node. The computational type of the compute node refers to a kind of computation to be fulfilled by the compute node. According to some embodiments, the computational type of the compute node can include addition operation, subtraction operation, and convolution operation, etc. Accordingly, the compute node can be a compute node configured to implement addition operation, a compute node configured to implement subtraction operation, a compute node configured to implement convolution operation, or the like. The computation parameters of the compute node can be necessary parameters for completing the type of computation corresponding to the compute node. According to some embodiments, a computational type of a compute node can be addition operation, and accordingly, computation parameters of the compute node can be an added in addition operation, and an augend in the addition operation can be obtained, as input data, via an obtaining unit, or the augend in the addition operation can be output data of a compute node prior to this compute node, etc.

S020, running the original network according to the model dataset and the model structure parameters of the original network, and obtaining instructions corresponding to the respective compute nodes in the original network.

According to some embodiments, the processor of the computer equipment can run the original network according to the model dataset and the model structure parameters of the original network, and obtaining the instructions corresponding to the respective compute nodes in the original network. According to some embodiments, the processor can further obtain input data of the original network, and run the original network according to the input data, the network model dataset and the model structure parameters of the original network, and obtain the instructions corresponding to the respective compute nodes in the original network. According to some embodiments, the above-mentioned process of running the original network to obtain the instructions of the respective compute nodes can in fact be a process of compiling. In other words, the instructions is obtained after compiling, and the instructions can be executed by the processor, for instance, the instructions are machine code. The process of compiling can be realized by the processor or a virtual device of the computer equipment. In other words, the processor or the virtual device of the computer equipment can run the original network according to the model dataset and the model structure parameters of the original network. The virtual device refers to virtualizing an amount of processor running space virtualized in memory space of a memory.

It should be understood that in the present example, running the original network refers to, the processor uses artificial neural network model data to run a machine learning algorithm (e.g., a neural network algorithm), and realize a target application (e.g., an artificial intelligence application such as speech recognition) of the algorithm by performing forward operation.

S030, generating an offline model corresponding to the original network according to the network weights and the instructions corresponding to the respective compute nodes of the original network, and storing the offline model corresponding to the original network in a nonvolatile memory (or a database).

According to some embodiments, the processor can generate the offline model corresponding to the original network according to the network weights and the instructions corresponding to the respective compute nodes of the original network. According to some embodiments, the processor can store the network weights and the instructions corresponding to the respective compute nodes of the original network in the nonvolatile memory to realize the generating and storing of offline model. For each compute node of the original network, the weight and the instruction of the compute node can be stored in one-to-one correspondence. In this way, when running the original network again, the offline model corresponding to the original network can be obtained from the nonvolatile memory directly, and the original network can be run according to the corresponding offline model without the need of compiling the respective compute nodes of the original network to obtain the instructions, thus, running speed and efficiency of a system can be improved.

It should be understood that in the present example, directly running the corresponding offline model of the original network refers to that, using the offline model to run a corresponding machine learning algorithm (e.g., a neural network algorithm) of the original network, and realize a target application (e.g., an artificial intelligence application such as speech recognition) of the algorithm by performing forward operation.

Figure 8:
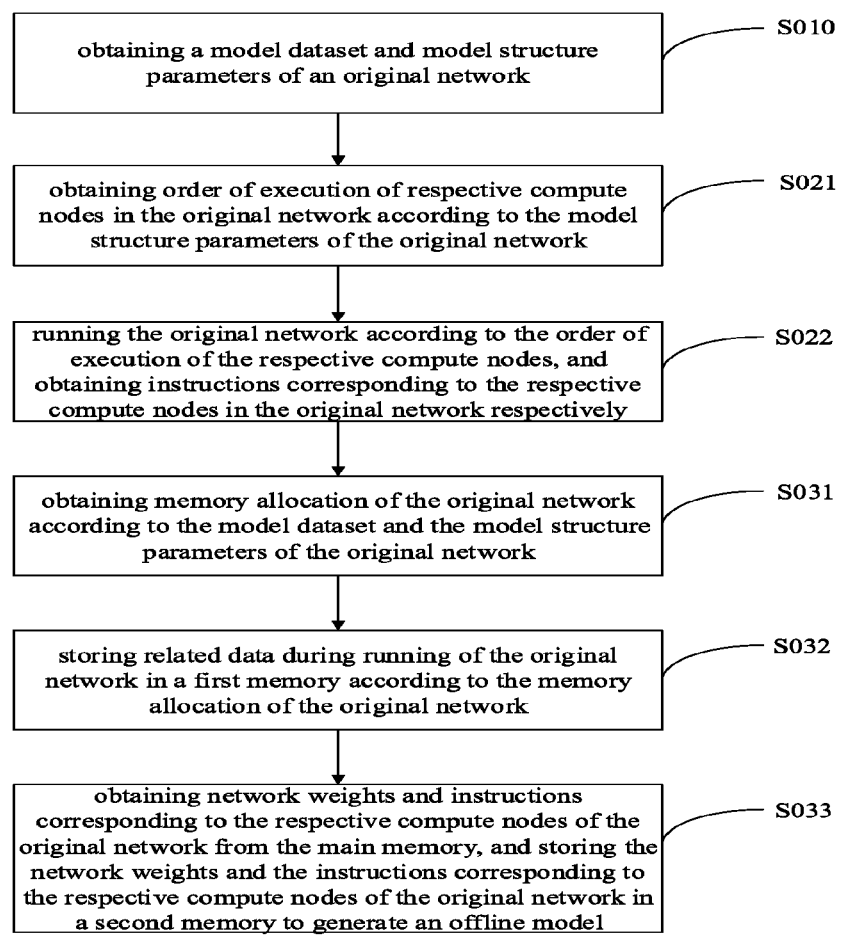
FIG. 8 is a flowchart of an offline model generation method, according to some embodiments.

According to some embodiments, as shown in FIG. 8, S020 can include: S021, obtaining order of execution of the respective compute nodes in the original network according to the model structure parameters of the original network. S022, running the original network according to the order of execution of the respective compute nodes in the original network, and obtaining the instructions corresponding to the respective compute nodes in the original network respectively.

According to some embodiments, the processor can obtain the order of execution of the respective compute nodes in the original network according to the model structure parameters of the original network. According to some embodiments, the processor can obtain the order of execution of the respective compute nodes in the original network according to the connections among the respective compute nodes in the original network. According to some embodiments, as shown in FIG. 9, input data of the compute node F4 can be output data of the compute node F1 and output data of the compute node F2, and input data of compute node F6 can be output data of the compute node F4 and output data of the compute node F5. Thus, the order of execution of the respective compute nodes in the neural network shown in FIG. 9 can be F1-F2-F3-F4-F5-F6, F1-F3-F2-F5-F4-F6, and the like. According to some embodiments, the compute nodes F1, F2, and F3 can be performed in parallel, and the compute nodes F4 and F5 can also be performed in parallel. The instances are given here merely for the purpose of explanation, and are not to be considered limiting of the order of execution.

S022, running the original network according to the order of execution of the respective compute nodes in the original network, and obtaining the instructions corresponding to the respective compute nodes in the original network respectively.

According to some embodiments, the processor can run the original network according to the order of execution of the respective compute nodes in the original network, so as to obtain the corresponding instructions of the respective compute nodes in the original network. According to some embodiments, the processor can compile data such as the model dataset of the original network to obtain the corresponding instructions of the respective compute nodes. According to the corresponding instructions of the respective compute nodes, computational functions fulfilled by the compute nodes can be known. In other words, computational attributes such as computational types and computation parameters of the compute nodes can be known.

FIG. 8 is a flowchart of an offline model generation method, according to some embodiments. According to some embodiments, as shown in FIG. 8, S030 can further include S031, S032 and S033.

S031, obtaining memory allocation of the original network according to the model dataset and the model structure parameters of the original network.

According to some embodiments, the processor can obtain the memory allocation of the original network according to the model dataset and the model structure parameters of the original network, obtain the order of execution of the respective compute nodes in the original network according to the model structure parameters of the original network, and can obtain the memory allocation of the current network according to the order of execution of the respective compute nodes in the original network.

According to some embodiments, related data during running of the respective compute nodes can be stored in a stack according to the order of execution of the respective compute nodes. The memory allocation refers to determining a position where the related data (including input data, output data, network weight data, and intermediate result data) of the respective compute nodes in the original network are stored in memory space (e.g., the first memory). According to some embodiments, a data table can be used for storing mappings between the related data (input data, output data, network weight data, intermediate result data, etc.) of the respective compute nodes and the memory space.

S032, storing the related data during the running of the original network in the first memory according to the memory allocation of the original network, where the related data during the running of the original network can include network weights, instructions, input data, intermediate computation results, output data, and the like, corresponding to the respective compute nodes of the original network.

According to some embodiments, as shown in FIGS. 9, X1 and X2 represent input data of the neural network, and Y represent output data of the neural network. The processor can convert the output data of the neural network into control commands for controlling a robot or a different digital interface. According to some embodiments, W1~W6 are used for representing network weights corresponding to the compute nodes F1, F2, and F3, and output data of the compute nodes F1~F5 can be used as intermediate computation results. According the confirmed memory allocation, the processor can store the related data during the running of the original network in the first memory, such as a volatile memory including an internal memory or a cache. See memory space shown in the left part of FIG. 10 for detailed storage of the related data.

Figure 10:
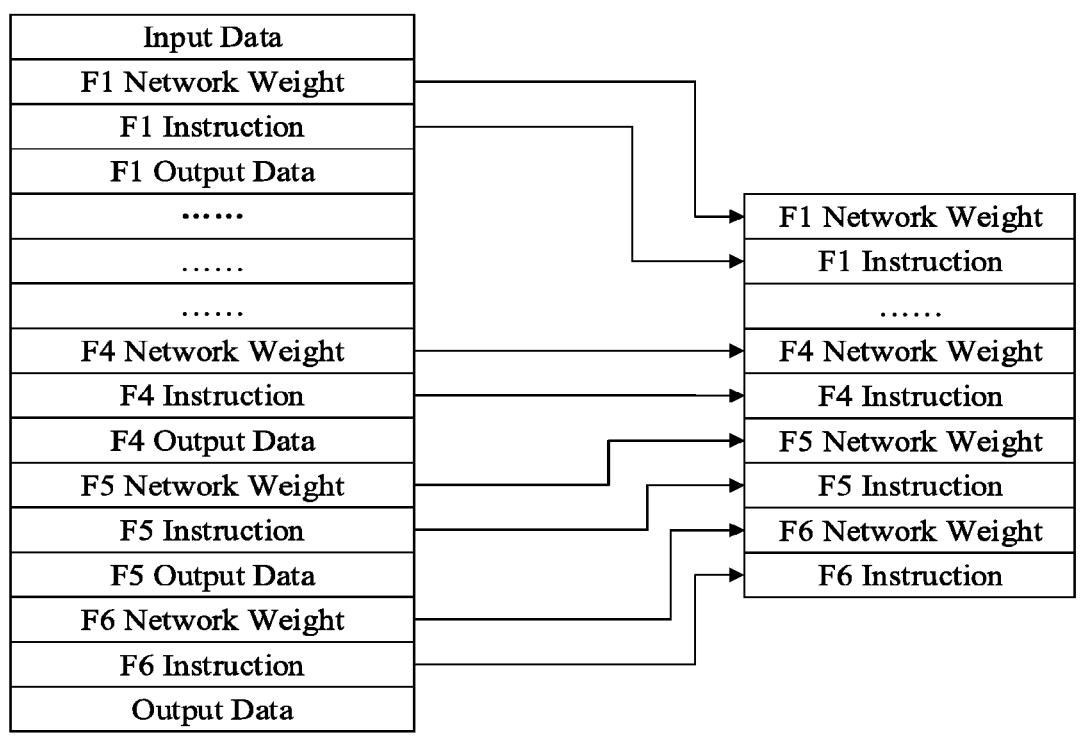
FIG. 10 is a diagram showing a generation process of an offline model of the network model in FIG. 9, according to some embodiments.

S033, obtaining the network weights and the instructions of the respective compute nodes of the original network from the first memory, and storing the network weights and the instructions corresponding to the respective compute nodes of the original network in the second memory to generate an offline model. The second memory can be a nonvolatile memory such as an external memory. FIG. 10 shows a specific generating process of the offline model, and the offline model corresponding to the original network can be stored in memory space shown in the right half of FIG. 10.

The above-mentioned generating process of the offline model will be described below with reference to the accompanied drawings FIG. 9 and FIG. 10.

First, the processor can obtain the model dataset, the model structure parameters, and the input data of the original network, so that the diagram of network structure of the original network can be obtained according to the model dataset and the model structure parameters of the original network, which is shown in FIG. 9.

Second, the processor can obtain the connections of the respective compute nodes in the original network according to the model structure parameters of the original network, and obtain the order of execution of the respective compute nodes in the original network as well as the memory allocation during the running of the original network according to the connections of the respective compute nodes, so that the position where the related data during the running of the original network are stored can be obtained. As shown in the memory space in the left part of FIG. 10, the related data during the running of the original network can be stored in a stack according to the order of execution of the respective compute nodes.

Finally, the processor can store the network weights and the instructions corresponding to the respective compute nodes of the original network in the second memory, which is nonvolatile, to generate the offline model. For detailed storage of the offline model, see memory space shown in the right part of FIG. 8 for reference. Besides, the offline model can only include data such as the necessary network weights and instructions for running the original network, and input data, output data, intermediate results, etc., during the running of the original network cannot be stored. Consumption of memory space of the second memory can thus be reduced.

As a further improvement, the offline model can also include node interface data, where the node interface data can be configured to indicate the connections among the respective compute nodes of the original network. According to some embodiments, the node interface data can further include input data sources and output data sources of the respective compute nodes. According to some embodiments, as shown in FIG. 9, the node interface data can include the compute nodes F1, F2, and F3 as start nodes, input of these compute nodes can be preset input data, output data of the compute node F1 can serve as input data of the compute nodes F4 and F5, and the like. By doing so, when running the original network again, the original network can be run according to the offline model corresponding to the original network as long as the start compute nodes and the input data of the original network are obtained.

It should be understood that though respective steps in the flowcharts FIGS. 5-8 are shown according to the direction of arrows, yet these steps can not necessarily be performed following the order indicated by the arrows. Unless clearly stated herein, the order for performing these steps is not strictly confined. These steps can be performed in a different order. Furthermore, at least part of the steps in FIGS. 5-8 can include a plurality of sub-steps or a plurality of phases. These sub-steps or phases cannot necessarily be performed and completed at the same time, instead, they can be performed at a different time. According to some embodiments, these sub-steps or phases cannot necessarily be performed sequentially, instead, they can be performed in turn or alternately with other steps, the sub-steps of other steps, or at least part of the phases.

One of ordinary skill in the art can understand that the entire or part of the flow in the methods as stated in the examples can be carried out by instructing related hardware via a computer program. The computer program can be stored in a nonvolatile computer readable storage medium. When the computer program is being executed, the flow of each of the methods as stated in the examples above can be implemented. Any reference to the memory, storage, database, or any other medium can include a nonvolatile and/or volatile memory, where the reference can be used in the examples provided in the present disclosure. The nonvolatile memory can include a ROM (Read Only Memory), a PROM (Programmable ROM), an EPROM (Electrically PROM), an EEPROM (Electrically Erasable PROM), or a flash memory. The volatile memory can include a RAM (Random Access Memory) or an external cache memory. By way of illustration and rather than limitation, the RAM can be obtained in various forms, such as a SRAM (Static RAM), a DRAM (Dynamic RAM), a SDRAM (Synchronous DRAM), a DDRSDRAM (Double Data Rate SDRAM), an ESDRAM (Enhanced SDRAM), a SLDRAM (Synchlink DRAM), a RDRAM (Rambus Direct RAM), a DRDRAM (Direct Rambus Dynamic RAM), and a RDRAM (Rambus Dynamic RAM).

An example of the present disclosure further provides a model conversion device. The model conversion device can include an obtaining unit, a determination unit, and a conversion unit, where the obtaining unit can be configured to obtain an initial offline model and hardware attribute information of computer equipment; the determination unit can be configured to determine whether model attribute information of the initial offline model matches the hardware attribute information of the computer equipment according to the initial offline model and the hardware attribute information of the computer equipment; and the conversion unit can be configured to, if the model attribute information of the initial offline model does not match the hardware attribute information of the computer equipment, convert the initial offline model to a target offline model that matches the hardware attribute information of the computer equipment according to the hardware attribute information of the computer equipment and a preset model conversion rule.

According to some embodiments, the model conversion device can be an application installed on the computer equipment. The application can provide an interface for reading the initial offline model from the first memory 120 or an external memory, so that the initial offline model can be obtained via the application. According to some embodiments, the application can further provide an interface for reading the hardware attribute information of the computer equipment, so that the hardware attribute information of the computer equipment can be obtained via the application. According to some embodiments, the application can further provide an interface for reading the preset model conversion rule, so that the preset model conversion rule can be obtained via the application. According to some embodiments, the application can be configured to, when the model attribute information of the initial offline model does not match the hardware attribute information of the computer equipment, convert the initial offline model to the target offline model that matches the hardware attribute information of the computer equipment according to the initial offline model, the hardware attribute information of the computer equipment, and the preset model conversion rule, and store the target offline model in the first memory or the second memory.

For a specific description of the model conversion device, see the description of the model conversion method above for reference. Each of the units in the model conversion device above can be wholly or partially implemented through software, hardware, and a combination thereof. Each of the units can be embedded or independently arranged in a processor of computer equipment in a form hardware, and can also be stored in a memory of the computer equipment in a form of software, so that the processor can call and perform an operation corresponding to each of the units.

Moreover, an example of the present disclosure further provides a computer readable storage medium. A computer program can be stored in the computer readable storage medium. The steps of the method in any example mentioned above can be implemented when a processor executes the computer program. Alternatively, the computer readable storage medium can include a nonvolatile memory and/or a volatile memory. The nonvolatile memory can include a ROM (Read Only Memory), a PROM (Programmable ROM), an EPROM (Electrically PROM), an EEPROM (Electrically Erasable PROM), or a flash memory. The volatile memory can include a RAM (Random Access Memory) or an external cache memory. By way of illustration and rather than limitation, the RAM can be obtained in various forms, such as a SRAM (Static RAM), a DRAM (Dynamic RAM), a SDRAM (Synchronous DRAM), a DDRSDRAM (Double Data Rate SDRAM), an ESDRAM (Enhanced SDRAM), a SLDRAM (Synchlink DRAM), a RDRAM (Rambus Direct RAM), a DRDRAM (Direct Rambus Dynamic RAM), and a RDRAM (Rambus Dynamic RAM).

According to some embodiments, the steps below can be implemented when the computer program is executed by the processor:

S100, obtaining an initial offline model and hardware attribute information of computer equipment.

According to some embodiments, the initial offline model refers to an offline model obtained directly by the computer equipment, and the initial offline model can be stored in the second memory 130. The offline model can include necessary network structure information, such as network weights and instructions of respective compute nodes in an original network, where the instructions can be configured to represent computational functions that the respective compute nodes can be configured to fulfill. The instructions can include information such as computational attributes of the respective compute nodes in the original network and connections among the respective compute nodes. According to some embodiments, the initial offline model of the example of the disclosure can be an offline model generated according to the original network directly, and can also be an offline model obtained through an offline model having other model attribute information being converted for once or a plurality of times, which is not confined here.

S200, determining whether model attribute information of the initial offline model matches the hardware attribute information of the computer equipment according to the initial offline model and the hardware attribute information of the computer equipment.

According to some embodiments, the model attribute information of the initial offline model can include a data structure, a data type, and the like, of the initial offline model. According to some embodiments, the model attribute information of the initial offline model can include an arrangement manner of each network weight and instruction, a type of each network weight, a type of each instruction, and the like, in the initial offline model. The hardware attribute information of the computer equipment can include an equipment model of the computer equipment, a data type (e.g., fixed point, floating point, and the like) and a data structure the computer equipment can be able to process.

According to some embodiments, the computer equipment can determine the data type and the data structure that the computer equipment can be able to process according to the hardware attribute information, and determine the data type and the data structure of the initial offline model according to the model attribute information of the initial offline model. According to the hardware attribute information of the computer equipment and the model attribute information of the initial offline model, if the computer equipment determines the computer equipment as being able to support the data type and the data structure of the initial offline model, then the computer equipment can determine that the model attribute information of the initial offline model matches the hardware attribute information of the computer equipment. According to the hardware attribute information of the computer equipment and the model attribute information of the initial offline model, if the computer equipment determines the computer equipment as not being able to support the data type and the data structure of the initial offline model, then the computer equipment can determine that the model attribute information of the initial offline model does not match the hardware attribute information of the computer equipment.

If the model attribute information of the initial offline model does not match the hardware attribute information of the computer equipment, S300 can be performed, the initial offline model can be converted to a target offline model that matches the hardware attribute information of the computer equipment according to the hardware attribute information of the computer equipment and a preset model conversion rule.

According to some embodiments, if the model attribute information of the initial offline model does not match the hardware attribute information of the computer equipment, which indicates that the computer equipment cannot be able to support running of the initial offline model, then the initial offline model can need to be converted so that the computer equipment can be able to use the initial offline model to realize corresponding computation. In other words, if the model attribute information of the initial offline model does not match the hardware attribute information of the computer equipment, the initial offline model can be converted to the target offline model that matches the hardware attribute information of the computer equipment according to the hardware attribute information of the computer equipment and the preset model conversion rule, where model attribute information of the target offline model matches the hardware attribute information of the computer equipment, and the computer equipment can be able to support running of the target offline model. As stated above, the target offline model can also include necessary network structure information, such as network weights and instructions of respective compute nodes in an original network.

If the model attribute information of the initial offline model matches the hardware attribute information of the computer equipment, then S400 can be performed, the computer equipment can run the received initial offline model directly. According to some embodiments, the computer equipment can perform computation according to the network weights and the instructions included in the initial offline model, so as to realize a computational function of the original network. According to some embodiments, if the model attribute information of the initial offline model matches the hardware attribute information of the computer equipment, which indicates that the computer equipment can be able to support the running of the initial offline model, then the initial offline model does not need to be converted, and the computer equipment can be able to run the initial offline model.

It should be understood that a process of the processor executing the computer program can be similar to the process of the model conversion method in the example above, for a specific description, see the preceding part of the text for reference.

The technical features in the above-mentioned examples can be combined randomly. For a brief description, not every possible combination of the technical features in the above-mentioned examples is described. However, combinations of these technical features shall be considered within the range of the description as long as they do not contradict to each other.

The above-mentioned examples are merely some examples of the present disclosure. The disclosure is described in a detailed way. Nonetheless, it should not be considered limiting of the scope of protection claimed by the present disclosure. It should be indicated that one of ordinary skill in the art can make some variations and improvements within the idea of the disclosure, and these variations and improvements are within the scope of protection claimed by the present disclosure. Therefore, the scope of protection claimed by the present disclosure shall be subject to the attached claims.

What is claimed is:

1. A model conversion method, the method comprising:
obtaining, by an input/output (I/O) interface of a computer system, an initial offline model, wherein the initial offline model is obtained by compiling an original neural network, and the initial offline model includes network weights and instructions of converted from respective compute nodes in the original neural network;
determining, by a processor of the computer system, whether model attributes of the initial offline model match a plurality of hardware attributes of the computer system; and
converting, by the processor, the network weights and the instructions included in the initial offline model to generate a target offline model based on the determination that the model attributes of the initial offline model do not match the plurality of hardware attributes of the computer system; wherein the processor is capable of executing the target offline model to implement a corresponding artificial intelligence application.

2. The model conversion method of claim 1, wherein wherein the model attributes and hardware attributes include at least one of data type and data structure.

3. The model conversion method of claim 2, wherein the converting, by the processor, the initial offline model to the target offline model further comprises:
selecting a target model conversion rule from a plurality of the preset model conversion rules according to the model attributes of the initial offline model and model attributes of the target offline model; and
converting the initial offline model to the target offline model according to the target model conversion rule; wherein the model attributes of the target offline model match the hardware attributes of the computer system.

4. The model conversion method of claim 3, wherein the selecting a target model conversion rule from the plurality of the preset model conversion rules according to the model attributes of the initial offline model and the model attributes of the target offline model further comprises:
selecting at least one applicable model conversion rule from the plurality of the preset model conversion rules according to the model attributes of the initial offline model and the model attributes of the target offline model; and
determining an applicable model conversion rule with a highest priority as the target conversion rule.

5. The model conversion method of claim 3, wherein the method further comprises:
prioritizing the at least one applicable model conversion rule among the preset model conversion rules according to process parameters of each of the at least one applicable model conversion rule;
wherein the process parameters of each of the at least one applicable model conversion rule includes one or more of conversion speed, power consumption, memory occupancy rate, and magnetic disk I/O occupancy rate.

6. The model conversion method of claim 1, wherein the method further comprises:
storing, by the I/O interface, the target offline model into a local memory of the computer system or an external memory connected to the computer system.

7. The model conversion method of claim 1, wherein the obtaining the initial offline model further comprises:
obtaining the initial offline model via an application in the computer system.

8. The model conversion method of claim 1, further comprises:
executing the target offline model to implement the corresponding artificial intelligence application, wherein the target offline model includes network weights and instructions.

9. A computer system comprising:
an input/output (I/O) interface, configured to obtain an initial offline model, wherein the initial offline model is obtained by compiling an original neural network, and the initial offline model includes network weights and instructions converted from respective compute nodes in the original neural network; and
a processor, configured to determine whether model attributes of the initial offline model matches a plurality of hardware attributes of the computer system, and then convert the network weights and the instructions included in the initial offline model to generate a target offline model based on the determination that the model attributes of the initial offline model do not match the plurality of hardware attributes of the computer system; wherein the processor is capable of executing the target offline model to implement a corresponding artificial intelligence application.

10. The computer system of claim 9, wherein
wherein the model attributes and hardware attributes include at least one of data type and data structure.

11. The computer system of claim 10, wherein the processor further configured to:
select a target model conversion rule from a plurality of the preset model conversion rules according to the model attributes of the initial offline model and model attributes of the target offline model; and
convert the initial offline model to the target offline model according to the target model conversion rule; wherein the model attributes of the target offline model match the hardware attributes of the computer system.

12. The computer system of claim 11, wherein the processor further configured to:
select at least one applicable model conversion rule from the plurality of the preset model conversion rules according to the model attributes of the initial offline model and the model attributes of the target offline model; and
determine an applicable model conversion rule with a highest priority as the target conversion rule.

13. The computer system of claim 11, wherein the processor further configured to:
prioritize the at least one applicable model conversion rule among the preset model conversion rules according to process parameters of each of the at least one applicable model conversion rule;
wherein the process parameters of each of the at least one applicable model conversion rule includes one or more of conversion speed, power consumption, memory occupancy rate, and magnetic disk I/O occupancy rate.

14. The computer system of claim 12, wherein the I/O interface is configured to store the target offline model into a local memory of the computer system or an external memory connected to the computer system.

15. The computer system of claim 9, wherein the I/O interface further configured to:
obtain the initial offline model via an application in the computer system.

16. The computer system of claim 9, wherein the processor further configured to:
execute the target offline model to implement the corresponding artificial intelligence application, wherein the target offline model includes network weights, instructions.

17. A non-transitory computer program product storing instructions which, when executed by at least one data processor forming part of at least one computing device, result in operations comprising:
obtaining, by an input/output (I/O) interface of the computer system, an initial offline model, wherein the initial offline model is obtained by compiling an original neural network, and the initial offline model includes network weights and instructions converted from respective compute nodes in the original neural network;
determining, by the processor of the computer system, whether model attributes of the initial offline model match a plurality of hardware attributes of the computer system; and
converting, by the processor, the network weights and the instruction included in the initial offline model to generate a target offline model when based on the determination that the model attributes of the initial offline model do not match the plurality of hardware attributes of the computer system; wherein the processor is capable of executing the target offline model to implement a corresponding artificial intelligence application.

18. The non-transitory computer program product storing instructions of claim 17 which, when executed by at least one data processor forming part of at least one computing device, result in operations wherein
wherein the model attributes and hardware attributes include at least one of data type and data structure.

19. The non-transitory computer program product storing instructions of claim 18 which, when executed by at least one data processor forming part of at least one computing device, result in operations wherein the converting, by the processor, the initial offline model to a target offline model further comprises:
selecting a target model conversion rule from a plurality of the preset model conversion rules according to the model attributes of the initial offline model and model attributes of the target offline model; and
converting the initial offline model to the target offline model according to the target model conversion rule; wherein the model attributes of the target offline model match the hardware attributes of the computer system.

20. The non-transitory computer program product storing instructions of claim 19 which, when executed by at least one data processor forming part of at least one computing device, result in operations wherein the selecting a model conversion rule as the target model conversion rule from the plurality of the preset model conversion rules according to the model attributes of the initial offline model and the model attributes of the target offline model further comprises:
selecting at least one applicable model conversion rule from the plurality of the preset model conversion rules according to the model attributes of the initial offline model and the model attributes of the target offline model; and determining an applicable model conversion rule with a highest priority as the target conversion rule;
wherein the method further comprises:
prioritizing the at least one applicable model conversion rule among the preset model conversion rules according to process parameters of each of the at least one applicable model conversion rules; wherein the process parameters of each of the at least one applicable model conversion rules includes one or more of conversion speed, power consumption, memory occupancy rate, and magnetic disk I/O occupancy rate.

* * * * *